United States Patent
Krishnaswamy et al.

(10) Patent No.: US 9,280,804 B2
(45) Date of Patent: Mar. 8, 2016

(54) ROTATION OF AN IMAGE BASED ON IMAGE CONTENT TO CORRECT IMAGE ORIENTATION

(71) Applicants: Aravind Krishnaswamy, San Jose, CA (US); Nicholas Butko, Mountain View, CA (US)

(72) Inventors: Aravind Krishnaswamy, San Jose, CA (US); Nicholas Butko, Mountain View, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/678,850

(22) Filed: Nov. 16, 2012

(65) Prior Publication Data

US 2014/0140609 A1 May 22, 2014

(51) Int. Cl.
*G06K 9/62* (2006.01)
*G06T 3/60* (2006.01)
*G06T 7/00* (2006.01)

(52) U.S. Cl.
CPC . *G06T 3/608* (2013.01); *G06T 3/60* (2013.01); *G06T 7/004* (2013.01)

(58) Field of Classification Search
None
See application file for complete search history.

(56) References Cited

U.S. PATENT DOCUMENTS

| | | | |
|---|---|---|---|
| 7,724,296 B2 | 5/2010 | Lonn | |
| 7,893,963 B2 | 2/2011 | Gallagher et al. | |
| 8,167,789 B2 | 5/2012 | Sato et al. | |
| 2003/0016883 A1 | 1/2003 | Baron | |
| 2003/0152291 A1 | 8/2003 | Cheatle | |
| 2004/0252318 A1* | 12/2004 | Kuroda et al. | 358/1.12 |
| 2005/0146620 A1 | 7/2005 | Monroe et al. | |
| 2008/0152199 A1* | 6/2008 | Oijer | 382/118 |

OTHER PUBLICATIONS

Wang, Lei, et al. "Image orientation detection with integrated human perception cues (or which way is up)." Image Processing, 2003. ICIP 2003. Proceedings. 2003 International Conference on. vol. 2. IEEE, 2003.
International Search Report, dated Jul. 8, 2014 for PCT Application No. PCT/US2013/070081.

* cited by examiner

*Primary Examiner* — Mark Roz
(74) *Attorney, Agent, or Firm* — IP Spring

(57) ABSTRACT

In some implementations, a method rotates images based on image content to correct image orientation. In some implementations, a method includes obtaining one or more identifications of content depicted in an image and determining a current orientation of the content depicted in the image. The current orientation is determined based on the one or more identifications of the content. An amount of rotation for the image is determined that orients the content closer to a predetermined reference orientation than to the current orientation. The image is rotated by the determined amount.

20 Claims, 10 Drawing Sheets

ROTATION OF AN IMAGE BASED ON IMAGE CONTENT TO CORRECT IMAGE ORIENTATION

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Many captured images, however, have a rotational skew due to a camera or other capturing device being unintentionally rotated from a level orientation when a picture is taken. In some cases, the user can later manually correct this rotation using various software programs.

SUMMARY

Implementations of the present application relate to rotation of an image based on analysis of the content of the image. In some implementations, a method includes obtaining one or more identifications of content depicted in an image and determining a current orientation of the content depicted in the image. The current orientation is determined based on the one or more identifications of the content. An amount of rotation for the image is determined that orients the identified content closer to a predetermined reference orientation than to the current orientation. The image is rotated by the determined amount.

Various implementations and examples of the above method are described. The predetermined reference orientation can be aligned with an approximately horizontal axis based on one or more borders or edges of the image in its current orientation. The current orientation can be determined based on selecting and applying one or more analysis techniques available from multiple techniques, where the selection of the techniques is determined based on the one or more identifications of the content. Determining a current orientation can include determining an orientation axis for the image based on one or more linear axes determined for one or more features in the image. In some implementations, an edge detection technique can be used to find at least one dominant edge in the image, and the method can determine an amount of deviation of the dominant edge from the predetermined reference orientation. An edge detection process can be used in response to determining that the image depicts a type of content that is associated with using the edge detection process, such as a depiction of a landscape or an outdoor environment.

In some implementations, determining a current image orientation can includes using a face orientation technique including determining an axis between two eyes of each face identified as being depicted in the image. The face orientation technique can be used in response to determining that the image depicts one or more faces. A resultant axis can be fitted to determined axes of the one or more faces, and the method can determine an amount of deviation of the resultant axis from the predetermined reference orientation. In some examples, the resultant axis can be determined as an average axis from the axes of faces, a mode axis from the axes of the faces, or a mean axis from the axes of the one or more faces. In another example, determining a current orientation can include inputting the image to a plurality of classifiers using machine learning to determine the current orientation of the image. In some implementations of the above method, input from a user can be received instructing rotation of the image, and a display of the rotated image can be correspondingly provided, including snapping the display of the image from the current orientation to a displayed rotated orientation. The displayed rotated orientation corresponds to the determined amount of rotation.

A method can include, in some implementations, obtaining an image including image content and identifying content depicted in the image. The identified content can be at least a portion of the image content of the image. The method selects and applies one or more techniques to determine a current orientation of the content depicted in the image, where the one or more techniques are selected from a plurality of available techniques. The selection of the techniques is based on the identified content depicted in the image. The method determines an amount of rotation for the image that orients the depicted content closer to a predetermined reference orientation than to the current orientation, and rotates the image by the determined amount of rotation.

In some implementations, a system can include a storage device and at least one processor accessing the storage device and operative to perform operations. The operations include obtaining one or more identifications of content depicted in an image and determining a current orientation of the content depicted in the image. The current orientation is determined based on the one or more identifications of the content. An amount of rotation for the image is determined that orients the identified content closer to a predetermined reference orientation than to the current orientation. The operations include rotating the image by the determined amount.

In various implementations and examples of the above system, the predetermined reference orientation is aligned with an approximately horizontal axis based on one or more borders or edges of the image in its current orientation. The operation of determining a current orientation can include selecting and applying one or more techniques to determine the current orientation of the image, where the techniques are selected from a plurality of techniques based on the one or more identifications. The operation of determining a current orientation can include determining an orientation axis for the image based on one or more linear axes determined for one or more features in the image. Determining a current orientation can include using at least one of an edge detection technique to find at least one dominant edge in the image, and a face orientation technique including determining an axis between two eyes of each face identified as being depicted in the image. Input can be received from a user instructing rotation of the image, and a display of the rotated image is caused, including snapping the display of the image from the current orientation to a displayed rotated orientation, where the displayed rotated orientation corresponds to the determined amount of rotation.

DETAILED DESCRIPTION

One or more implementations described herein relate to rotation of an image based on image content to correct an orientation of the image. In various implementations, a system obtains identifications of content depicted in an image. Based on the identified content, the system can determine a current orientation of image content and whether that content needs rotation to correct its orientation. The system can then rotate the image to the corrected orientation. These and other described features can lead to automatically-determined and appropriate rotations to images for a user.

The system can obtain identifications of identified content depicted in the image. For example, facial recognition or object recognition can provide identifications such as descriptors of the image content. The system can determine a current orientation of image content based on the identifications of the content. For example, in some implementations, one or more analysis techniques are selected based on the identified content and the selected techniques are applied to the image to determine the current orientation of the content. Such analysis techniques can include techniques more applicable or effective for certain types of content such as faces of people or landscape or outdoor environments. Some implementations can use machine learning techniques to determine the current orientation. Various implementations can find a resultant orientation that takes into account multiple occurrences and/or types of content depicted in the image. A system can determine an amount of rotation for the image that orients the depicted content closer to a reference orientation, such as a horizontal orientation, and rotate the image by the determined amount to correct the image orientation.

Such features allow automated rotation correction for images based on the image content, which provides appropriate correction of skew in images. For example, rotation that is determined based on identified image content can allow more accurate, consistent, and satisfactory orientation correction for images. Some implementations require no manual manipulation of the image by the user to correct the orientation of the image, and some implementations can determine a corrected orientation as a guide to enable easier and quicker manual manipulation of image orientation by a user.

Figure 1:
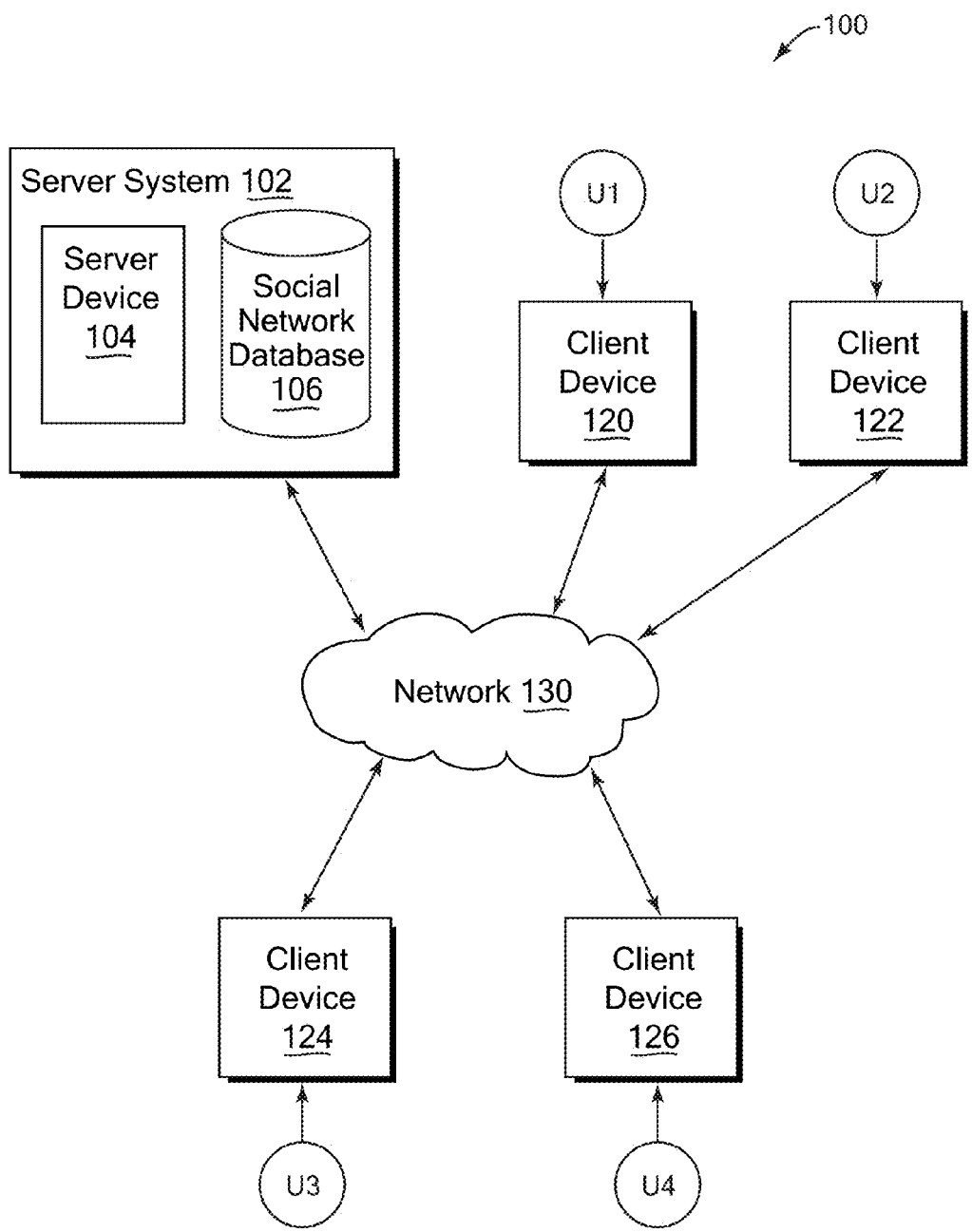
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a social network database 106 or other storage device. Network environment 100 also can include one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, users U1, U2, U3, and U4 may communicate with each other using respective client devices 120, 122, 124, and 126, and in some implementations each user can receive messages and notifications via a social network service implemented by network system 100. In one example, users U1, U2, U3, and U4 may interact with each other via the social network service, where respective client devices 120, 122, 124, and 126 transmit communications and data to one or more server systems such as system 102, and the server system 102 provides appropriate data to the client devices such that each client device can receive shared content uploaded to the social network service via server system 102.

The social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images (such as photos), video sequences, audio sequences or recordings, or other types of content for access by designated sets of users of the social network service, send multimedia information and other information to other users of the social network service, participate in live video, audio, and/or text chat with other users of the service, etc. A user can organize one or more albums of posted content, including images or other types of content. A user can designate one or more user groups to allow users in the designated user groups to access or receive content and other information associated with the user on the social networking service. As used herein, the term "social networking service" can include a software and/or hardware system that facilitates user interactions, and can include a service implemented on a network system. In some implementations, a "user" can include one or more programs or virtual entities, as well as persons that interface with the system or network.

A social networking interface, including display of content and communications, privacy settings, notifications, and other features described herein, can be displayed using software on the client device, such as application software or client software in communication with the server system. The interface can be displayed on an output device of the client device, such as a display screen. For example, in some implementations the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Other implementations can use other forms of devices, systems and services instead of the social networking systems and services described above. For example, users accessing any type of computer network can make use of features described herein. Some implementations can provide features described herein on systems such as one or more computer systems or electronic devices that are disconnected from and/or intermittently connected to computer networks.

Figure 2A:
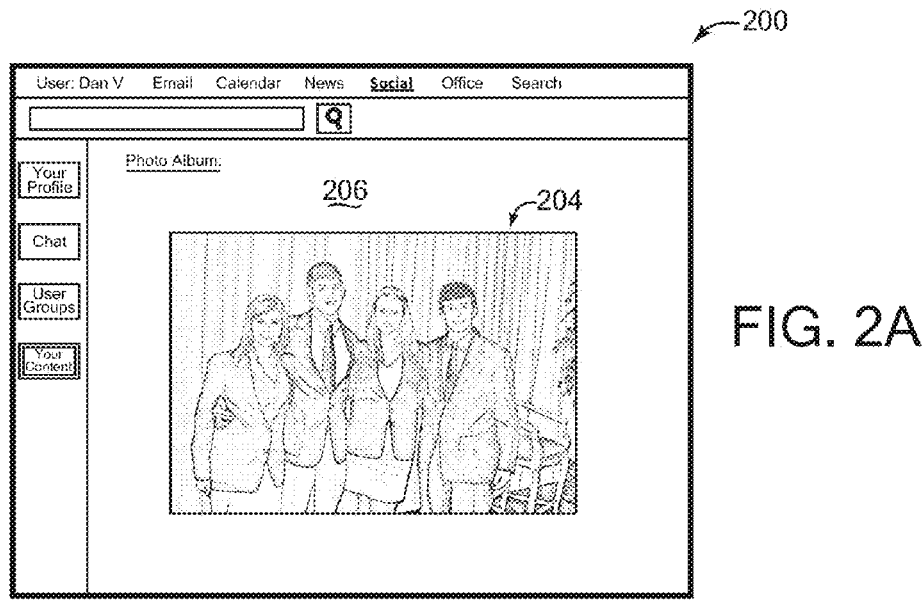
FIGS. 2A-2F are illustrations of an example of rotating an image having facial content to correct its orientation, according to some implementations.

FIG. 2A is a diagrammatic illustration of an example simplified graphical interface (GUI) 200 displaying an image which can be rotated for orientation correction according to some implementations described herein. GUI 200 can be displayed on a display device, e.g., of a client device 120, 122, 124, and/or 126 of FIG. 1, or a server system 102 in some implementations. In one example, a user can be viewing images on the interface 200 for a social networking service or application running in a social networking service. Other implementations can display images using an application program, operating system, or other service or system, such as on a standalone computer system, portable device, or other electronic device.

In the current example, the system displays an image 204 in a display area 206 of the interface 200. The image 204 can be stored on one or more storage devices accessible to the interface and/or social network service, such as on a server database 106, local storage to a client device, etc. In one example, the user may have uploaded the image 204 to a social networking service. In the example of FIG. 2A, the image 204 is a digital image, such as a digital photograph taken by a camera, and stored in an album of the user Dan V. Various images in collections such as albums, or spread among other collections and storage devices, can all be processed by one or more of the features described herein.

Figure 2B:
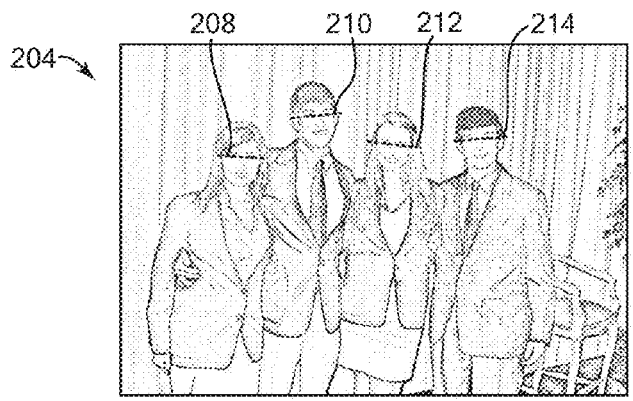

In FIG. 2B, the image 204 has been analyzed by the system (which can be the social networking service, one or more server systems, and/or one or more client devices in various embodiments) using features described herein. Such features can include examining the image 204 to determine identified content depicted in the image. The "identified content," as referred to herein, includes recognized depicted features such as objects, persons, landscape features, landmarks, or other content. Various techniques can be used to identify such content, such as facial recognition, object recognition, etc. In the example of FIG. 2B, faces of persons have been recognized.

The identifications of content depicted in the image allows the system to apply techniques pertinent to that type of identified content to achieve better results in correcting rotation. For example, faces have been recognized in the image 204 and a technique for determining image orientation based on human faces can be employed by the system. In one example, the system can draw a vector (represented as a dashed line in FIG. 2B) between the two eyes of each recognized face in the image 204, or of a subset of recognized faces. For example, the lines 208, 210, 212, and 214 can be drawn between the eyes of each respective face in the image 204.

Figure 2C:
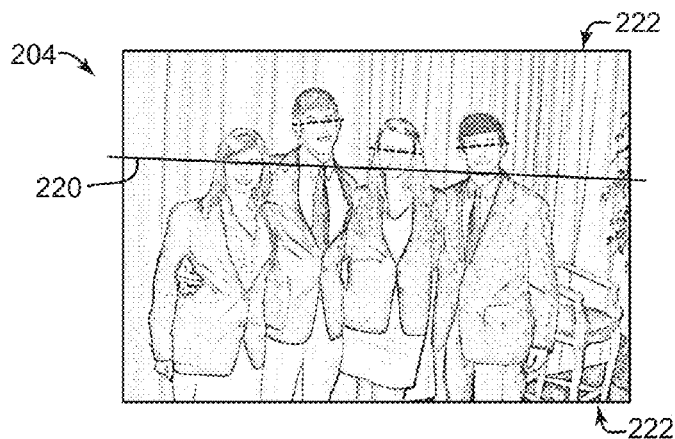

As shown in FIG. 2C, the system can determine a resultant axis 220 based on the individual face lines 208, 210, 212, and 214. The resultant axis can be determined using any of a variety of techniques, some of which are explained in greater detail below. In some examples, the resultant axis can be the result of analyzing the individual face lines, such as an average, median, mean, mode, linear regression, or other result of analyzing the face lines in the image. In the example of FIG. 2C, the resultant axis 220 has been determined as the median of the various face lines 208, 210, 212, and 214. For example, the face lines 210 and 214 are rotated in a counterclockwise direction relative to a reference axis such as a horizontal axis determined based on the top and bottom (horizontal) edges 222 of the image 204. The face line 210 is the most rotated in that counterclockwise direction. The face lines 208 and 212 are rotated in a clockwise direction relative to the reference axis, where the face line 212 is the most rotated in the clockwise direction. The median is the line in the middle of the distribution, which in this example is either the line 208 or the line 214. Other considerations or image properties can influence the selection of the resultant axis. For example, if there are two medians, then they can be averaged to obtain the resultant axis. In this example of FIG. 2C, the face line 208 is one of the two medians and is selected as the resultant axis 220 since line 208 is closer to the reference axis. The resultant axis 220 is used to indicate a current orientation of the image content depicted in image 204.

Figure 2D:
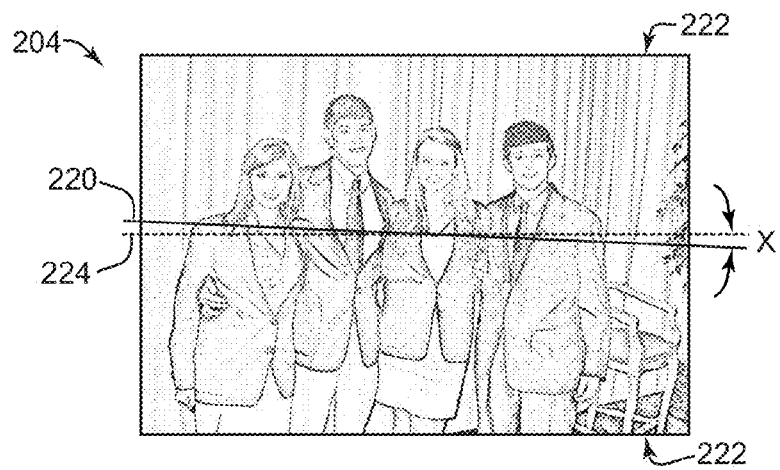

In FIG. 2D, the system has determined an amount of rotation for the image 204 that would orient the image content to or close to a desired orientation aligned with the reference axis. In this example, the desired orientation is for the resultant axis 220 be horizontally oriented. To achieve the desired orientation, the image 204 needs to be rotated by an amount X as shown in FIG. 2D, which is an angle between the resultant axis 220 and the horizontal reference axis 224 that is parallel to the horizontal edges 222 of the image 204.

Figure 2E:
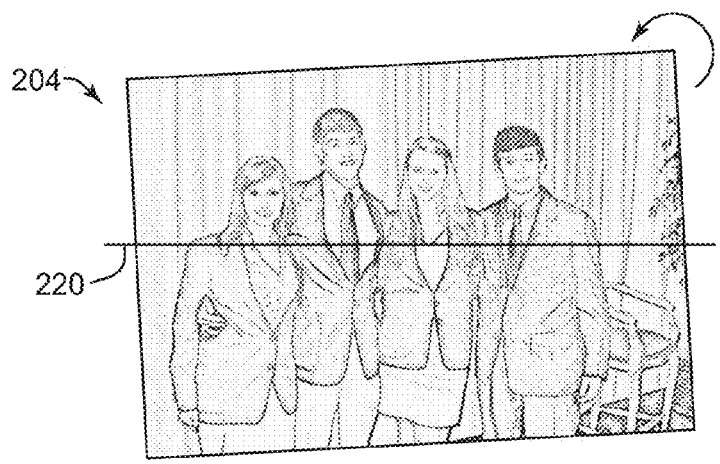
Figure 2F:
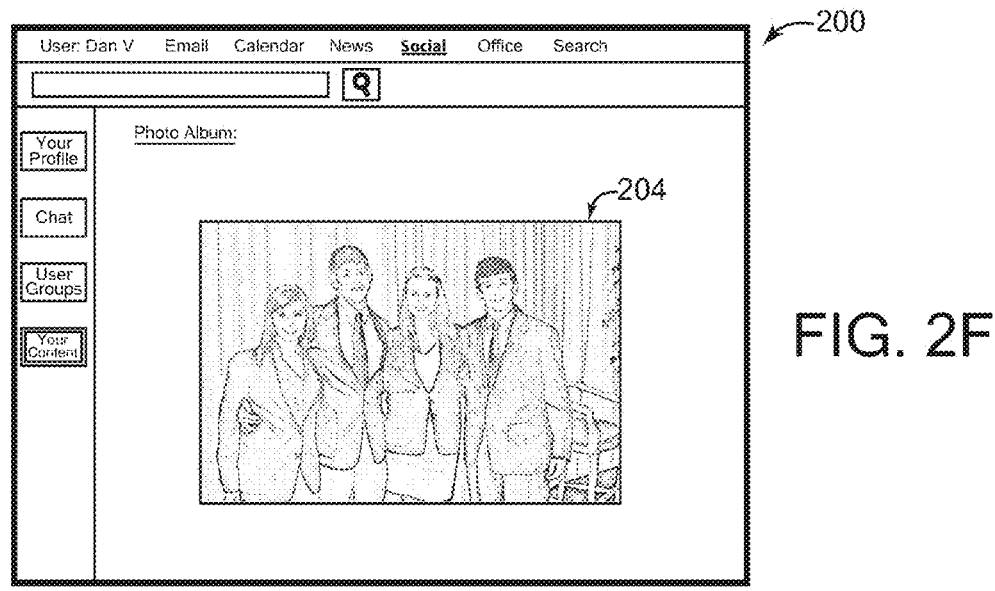

In FIG. 2E, the image 204 is rotated by the amount determined in FIG. 2D such that the resultant axis 220 is made horizontal, e.g., such that the resultant axis 220 is positioned at the same rotational position as the reference axis 224 of FIG. 2D. This rotation results in the image 204 having a corrected rotation that presents the image content (such as the recognized faces in the image 204) closer to a horizontal orientation. After rotation, some implementations can crop the image 204 so that the edges of the image are horizontal and vertical in their new orientation. An example of the image 204 after cropping is shown in FIG. 2F.

Figure 3A:
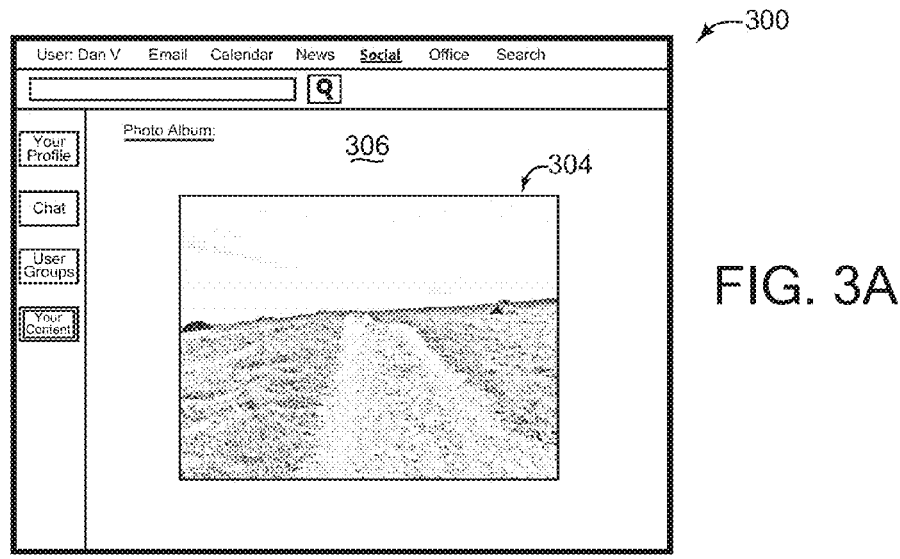
FIGS. 3A-3F are illustrations of an example of rotating an image having landscape content to correct its orientation, according to some implementations.

FIG. 3A is a diagrammatic illustration of another example of a simplified graphical interface (GUI) 300 displaying a different image which can be rotated for orientation correction according to some implementations described herein. In some implementations, as shown, GUI 300 can be similar to the GUI 200 described above for FIGS. 2A-2F.

Figure 3B:
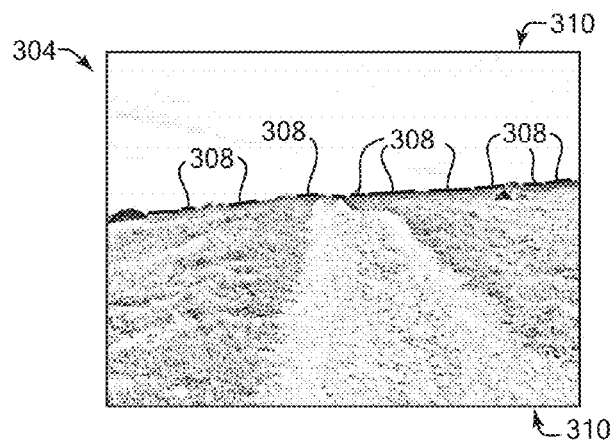

In the current example, the system displays an image 304 in a display area 306 of the interface 300. For example, the image can be a digital image stored on the system similarly as described above. In FIG. 3B, the image 304 has been analyzed using features described herein. As described above, such features can include examining the image 304 to determine identified content depicted in the image. In the example of FIG. 3B, landscape features have been recognized. For example, in some implementations an image recognition technique can provide identifications that describe identified content in various degrees of specificity. In one example, the identifications describe a path or road and grass as being depicted in the image.

In response to the identifications of content in the image, one or more techniques can be selected to determine image orientation more accurately. For example, particular techniques can be used if the depicted content is identified as a landscape, outdoor environment, and/or related features. In this example, the system has used a technique to examine the pixels of the image 304 to determine one or more dominant lines or edges. One or more well known techniques can be used to find such dominant lines or edges in an image, as described below. In the example of FIG. 3B, the system has found multiple dominant lines 308 in image 304. These are lines or edges in image 304 that are the most prominent, such as in length and/or visibility. In other embodiments, one most dominant line can be determined.

Figure 3C:

In FIG. 3C, a resultant axis 312 has been determined based on the dominant lines 308 determined as shown in FIG. 3B. In some implementations, the resultant axis 312 can be determined by combining the dominant lines 308, such as by using an averaging technique, linear progression, the median, or the mode of the dominant lines 308 or in other examples explained in below. In the example of FIG. 3C, the resultant axis 312 can be determined as the average of the dominant lines 308. In other implementations, if a single dominant line 308 is found, that line can be used as the resultant axis. The resultant axis 312 is used to indicate a current orientation of the image content depicted in image 304.

Figure 3D:
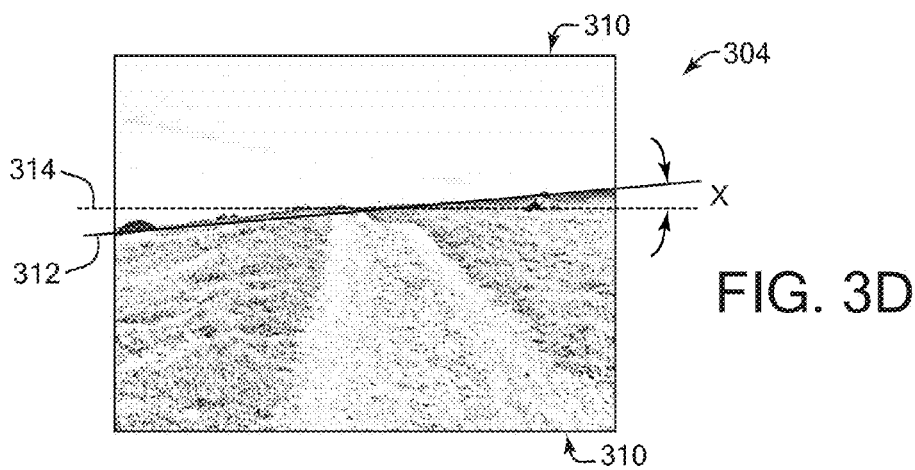

In FIG. 3D, the system can determine an amount of rotation for the image 304 that would orient the image 304 to or close to a desired orientation. In this example, the desired orientation is aligning the resultant axis 312 with a horizontal axis. To achieve the desired orientation, the image 304 needs to be rotated by an amount X as shown in FIG. 3D, which is an angle between the resultant axis 312 and a horizontal reference axis 314 that is parallel to the horizontal (top and bottom) edges 310 of the image 304.

Figure 3E:
Figure 3F:
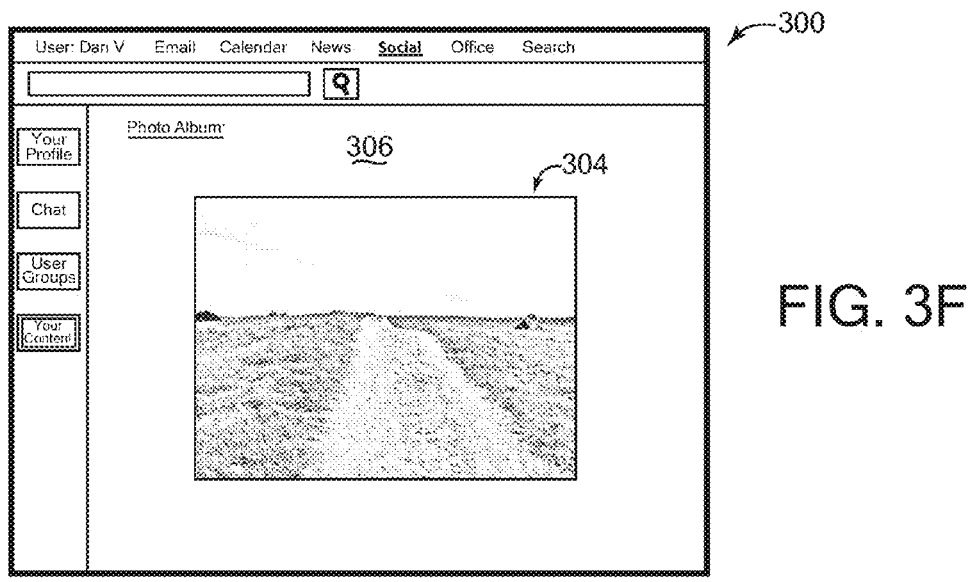

In FIG. 3E, the image 304 is rotated by the amount determined in FIG. 3D such that the resultant axis 312 is made horizontal, e.g., such that the resultant axis 312 is positioned at the same rotational position as the reference axis 314 of FIG. 3D. This rotation results in the image 304 having a corrected rotation that presents the landscape in the image 304 closer to a horizontal orientation. After rotation, some implementations can crop the image 304 so that the edges of the image are horizontal and vertical in their new orientation. An example of the image 304 after cropping is shown in FIG. 3F.

Figure 4:
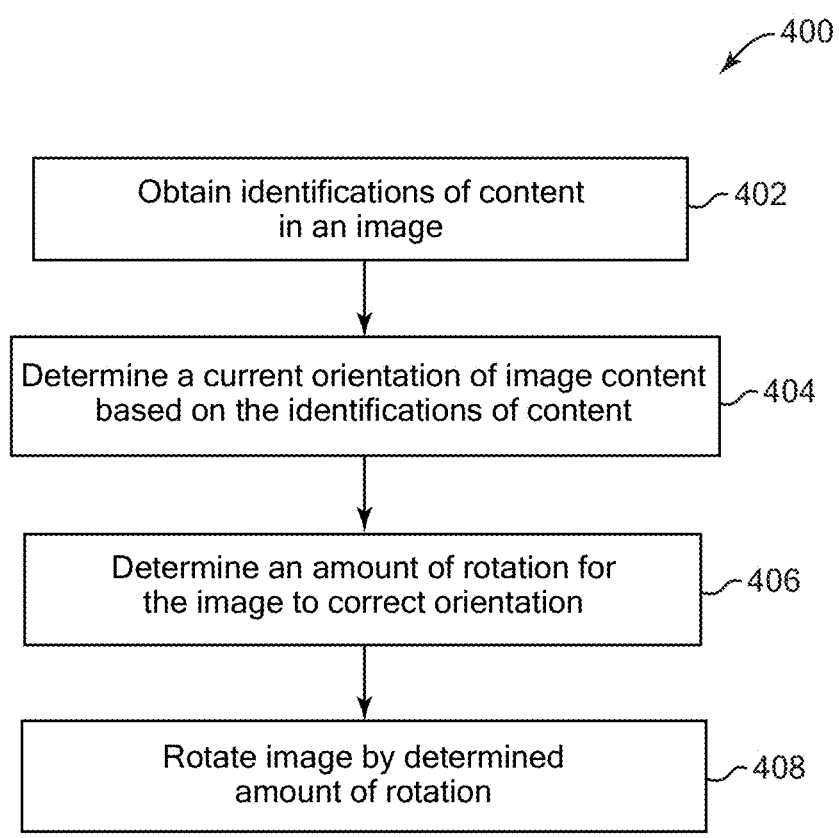
FIG. 4 is a flow diagram illustrating an example method of using rotation to correct an orientation of an image based on content of the image, according to some implementations.

FIG. 4 is a flow diagram illustrating one example of a method 400 of using rotation to correct the orientation of an image based on content of the image. Method 400 can be implemented on a computer system, such as one or more client devices and/or server systems, e.g., a system as shown in FIG. 1 in some implementations. In described examples, the system includes one or more processors or processing circuitry, and one or more storage devices such as a database 106 and/or other storage device. In some implementations, different components of a device or different devices can perform different blocks or other parts of the method 400. Method 400 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 400 can be performed as part of or component of an application running on a client device, or as a separate application or software running in conjunction with other applications and operating system.

In block 402 of method 400, one or more identifications of content in a subject image are obtained by the method. "Identifications" of content, or "identified content," as referred to herein, can include features such as objects, people, landscape features, landmarks, or other elements depicted in the image, which have been identified (e.g., recognized) from the depicted content of the image. Various techniques can be used to identify such content, such as facial recognition to identify that a face of a person is depicted and/or identify the identity of the person. For example, in a social networking service, a recognized face can be compared to faces of users of the service to identify which people depicted in images are also users of the service. Object and facial recognition techniques can be used to identify types of content, such as faces, landscapes, or other types. For example, recognition techniques can provide a classification, type and/or model of a depicted object or other features. Some images can be associated with identifications or identifiers such as tags that describe content depicted in the image, and these tags can be obtained as identifications of depicted content. In various implementations, the identifications can be determined by the method 400 or can be obtained by receiving one or more content identifications determined by a different process or system.

In block 404, the method determines a current orientation of content in the image based on the identifications of image content. Some implementations can determine the current orientation of the content identified in block 402, and the orientation of this content can be applicable to all the image content (identified and not identified). In some implementations, the identified content is content recognized from a recognition technique, and/or the identified content can be of different types. The identifications of content influence how the orientation of the image is determined. For example, different techniques can be used based on the particular identifications of the identified content, and/or different technique results can be weighted based on the identified content. Various implementations can find a resultant orientation axis for the image that takes into account multiple occurrences and/or types of content depicted in the image. Different example implementations of block 404 are described below with reference to FIG. 5.

In block 406, the method determines the amount of rotation for the image which will correct the current orientation determined in block 404. For example, the amount of rotation can orient the image so that the image content is aligned or positioned closer to a predetermined reference orientation than to the current orientation. In some implementations, the amount of rotation can be an amount of deviation of the current image orientation from the predetermined reference orientation. The predetermined reference orientation can be based, for example, on horizontal and/or vertical axes as indicated by the edges or borders of the image in its current orientation. In some implementations, the reference orientation can be based on one or more axes of a viewing area in which the image is displayed, such as interface 200 or 300 as shown in FIG. 2 or 3.

In block 408, the image is rotated by the amount determined in block 406. The image data can be rotated and the image saved in the new rotational position, for example. Some embodiments can also crop the image in the rotated orientation. If the image is being displayed, then the image can be displayed at the rotated orientation.

Figure 5:
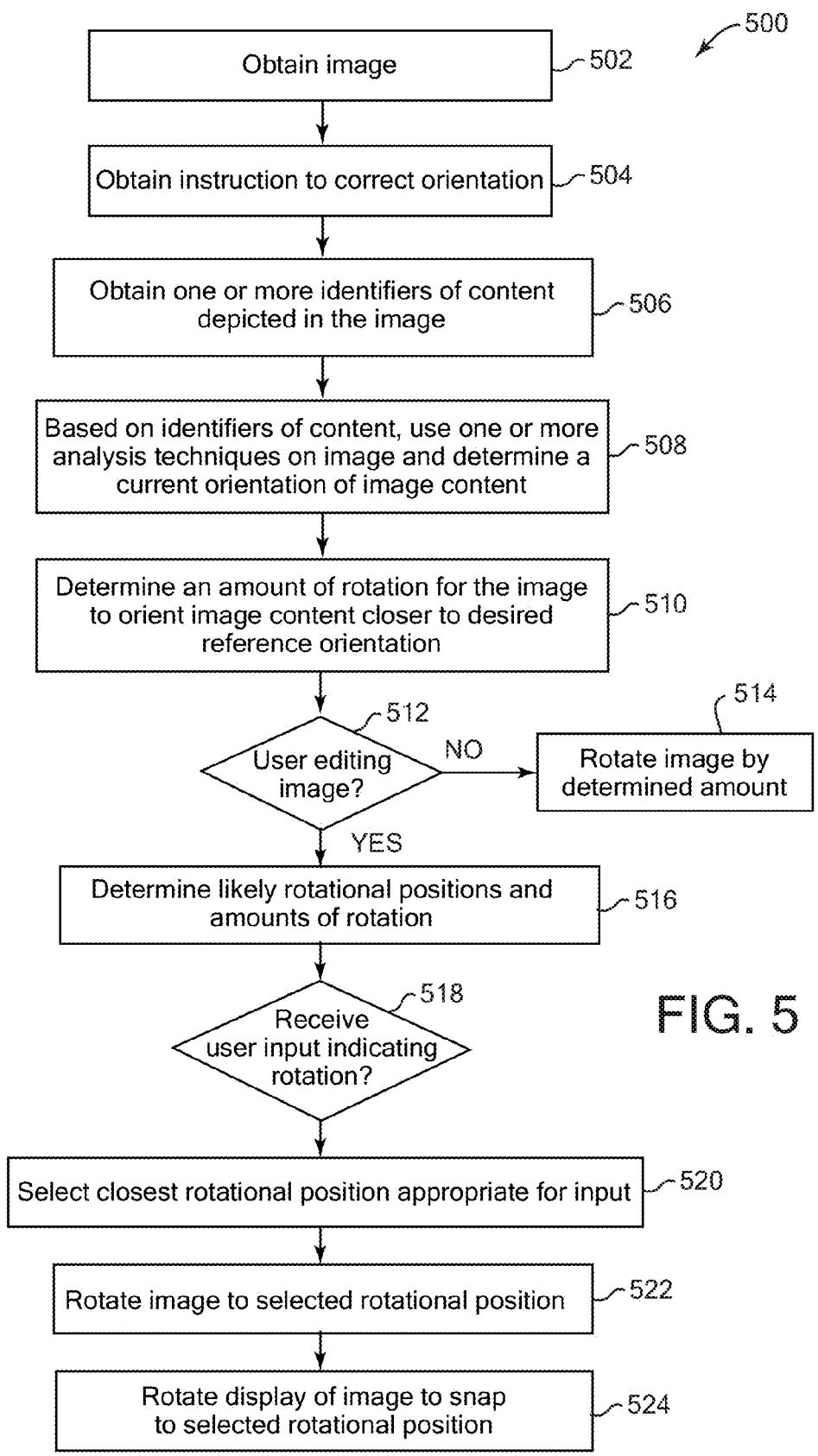
FIG. 5 is a flow diagram illustrating an example implementation of the method of FIG. 4, according to some implementations.

FIG. 5 is a flow diagram illustrating an example method 500 providing an implementation of the method 400 for using rotation to correct the orientation of images based on content of the images. Method 500 can be implemented on one or more systems similarly as described above for method 400 of FIG. 4.

In some implementations, the method 500 can be initiated by a user, such as a user providing or having access to one or more images. A user may, for example, have selected the initiation of the method 500 from an interface such as a social networking interface or other graphical interface. In some implementations, the method 500 can be initiated automatically by a system, such as being periodically performed by scanning for images in particular stored collections, performed based on a particular event such as one or more images being newly uploaded to or accessible by the system, or performed based on a condition occurring as specified in custom preferences of one or more users.

In block 502, the method obtains an image to examine its current orientation and correct its rotation, if appropriate. The obtained image can be a digital image composed of multiple pixels, for example, and can be stored on one or more storage devices of the performing system, or otherwise accessible to the method. In some implementations, the image can be included in an album or other collection associated with a particular user of the system, such as an album provided in an account of a user of a social networking system as in the example of FIG. 2A or 3A.

In block 504, the method optionally obtains an instruction to correct the orientation of the image. In some implementations, the image can be displayed to a user on a display device, and the user can input a command or other instruction to indicate he or she wants the orientation of the image to be corrected. Some implementations allow a user to command that the interface enter a "rotation mode" that allows the user to manually rotate the image. This manual rotation can be assisted using the orientation correction features described herein. In other implementations, the method corrects the orientation of the image without obtaining an explicit instruction to do so.

In block 506, the method obtains one or more identifiers of content depicted in the image. As described above with reference to block 402 of method 400, the identifiers indicate a type and/or other description of identified content such as recognized features, objects, or people. In some example implementations, the identifiers can be descriptors indicating the depicted content. For example, some descriptors can be general or broad, such as "people," "landscape," or "mountain," while other descriptors can be more specific, such as "Bob G.," "Eiffel Tower," and "Lake Tahoe." Some descriptors may be specific toward a particular brand or model of product or service recognized in the image. In some implementations of object recognition, multiple descriptors can be provide for each feature or object, each such descriptor having different specificity correlated to the confidence of the recognition. For example, one descriptor for a recognized feature can be "building" having a high confidence, while another more-specific descriptor for the same feature can be "Empire State Building" and having a lower confidence.

A variety of techniques can be used to obtain the identifiers of content. In some implementations, one or more object recognition techniques can be used to identify content. For example, facial recognition techniques can be used to identify faces in the image. Some implementations can identify that there are faces depicted, and do not need to identify the names or identities of the persons for those faces. Additionally or alternatively, some implementations can identify the persons depicted, such as by standard name, user name on a social networking system, and/or other identification. Some implementations can use other object recognition techniques to identify objects such as articles, items, vehicles, etc. Recognition techniques can be used in some implementations to identify landscape features such as mountains, trees, grass, lakes, rivers, etc. In some implementations, such face and object recognition techniques can use prior user selections and judgments to influence how depicted features are recognized. Implementations can provide the identifiers of depicted content to the method 500 from one or more other processes that perform the recognition, and/or the method 500 can perform feature recognition in whole or in part in block 506.

In block 508, based on the one or more identifiers obtained in block 506, the method uses one or more analysis techniques on the image and determines a current orientation of the content depicted in the image. The identifiers describing the content can influence how the method 500 analyzes the image to determine the current orientation of the content. In some implementations, the identifiers can influence which of multiple available analysis techniques to use in analyzing the image content for its orientation. Some implementations can use the identifiers to determine how to weigh the results of different analysis techniques in determining the orientation of the image content. Some implementations of block 508 are described in greater detail below with respect to FIG. 6.

In block 510, the method determines an amount of rotation for the image in order to orient the image content at (or closer to) a desired reference orientation. The desired reference orientation can be alignment with one or more predetermined axes. The predetermined axes can be horizontal, vertical, or other defined direction. For example, a horizontal reference axis can be defined as an axis approximately parallel to the top and bottom edges of the image in the current and original orientation of the image, if the image is a standard rectangular image having parallel edges. In some implementations, the image may have borders displayed within the edges of the image, and a reference axis can be aligned with one or more of such borders in the original orientation of the image. Other reference axes can be defined in other implementations. For example, a reference orientation can be defined based on a horizontal or vertical axis in a viewing area of a display device in which a user is viewing the image. In one example, the reference axis can be a horizontal axis as defined in a user interface such as the interface 200 or 300 as described above in the examples of FIGS. 2 and 3.

The amount of rotation for the image can be determined by examining the difference in rotational position between the current orientation and the desired reference orientation. In some implementations, a resultant axis can be determined in block 508 to indicate the original orientation of the image. The amount of rotation can be the angular difference between the resultant axis and the reference axis. Examples of such an implementation are described above with reference to FIGS. 2C and 3C.

In block 512, the method checks whether a user is editing the image. In some implementations or cases, a user may wish to manually rotate the image to a corrected orientation or other desired rotational position. For example, the user may be viewing the image displayed in an image editing program in a graphical interface, or may have entered an editing mode of a program. In other implementations or cases, a user may not be editing the image. For example, the system may have selected the image from a collection of images stored on a storage device, and can be correcting the orientation of the image using method 500 without displaying the image and without a user desiring to edit the image.

If a user is not editing the image, then in block 514 the method rotates the image by the amount determined in block

510. The method can store the image data in its rotated orientation. In some implementations, the method stores the image in its rotated orientation over the old image, or in other implementations, the rotated image is stored as a separate copy that preserves the original image. Some implementations can also crop the rotated image such that the edges of the image are made approximately horizontal and vertical in the rotated orientation. Examples of cropped images are described above with reference to FIGS. 2F and 3F. In implementations in which the image is being displayed, the image display can be changed to the rotated orientation after the new rotational position is determined. In other implementations or cases, the image data is rotated and saved and no display is updated.

If a user is editing the image in block 512, then the method continues to block 516 in which the method determines the likely rotational positions desirable to the user and the amounts of rotation needed for those positions. In some implementations, this can include using the desired orientation and amount of rotation determined in block 510 as one of the likely rotational positions to which the user may desired to rotate the image. In some implementations, additional likely rotational positions can be determined in block 510 and/or in block 512. In some examples, the method 500 may produce a number of different possible results from different applied techniques, and each of these results can provide a likely rotational position for display. For example, one desired rotational position can be a horizontal position of people's faces in the image determined using a facial orientation technique, and another desired rotational position can be a horizontal position of a landscape feature such as a horizon in the same image that was determined using a dominant line technique (described with reference to FIG. 6). Each of these desired rotational positions can be determined as likely rotational positions for the image for the user. In another example, the block 508 can be repeated to find a different resultant axis in the image, based on one or more different techniques and/or one or more different parameters or conditions used in the techniques. This second resultant axis can be used to determine another likely rotational position. In some implementations, a number of possible rotational positions for block 512 can be determined from classifiers used in a machine learning implementation, examples of which are described in greater detail with respect to FIG. 7.

In block 518, the method checks if user input has been received indicating that the user wishes the image to rotate on the display. If not, the method continues to check for user input at block 518 (while other functions and processes of the system continue to be performed). If user input for rotating the image has been received, then the method continues to block 520 in which the closest of the determined likely rotational positions is selected as appropriate for the user input. For example, if the user input indicates to rotate the image clockwise, then the next closest determined rotational position in that rotational direction is selected.

In block 522, the method rotates the image by an amount associated with the selected rotational position, including rotating the image data to the rotated position. In next block 524, the method rotates the display of the image on the display screen for the user to the selected rotational position. In some implementations, the display of the image from the current position to the selected position can be displayed as a "snap" to the selected position, e.g., as the manual rotation of the image gets within a predetermined range of the predetermined position, the image is snapped to the predetermined position. Some implementations can display indicators of all of the likely positions determined in block 516 around the image, and can snap the display of the image to the rotational positions in accordance with user input.

In some implementations of method 500, after rotation of the image (e.g., in block 514 or blocks 522-524), the method can check for user input as to whether the rotated orientation is acceptable to the user. If the user inputs indicates that it is not acceptable, another iteration of method 500 can be performed in which the image is rotated from its current rotated orientation. Alternatively, the method can obtain the original, unrotated image and use other analysis techniques to determine a different rotation than in one or more previous iterations of the method.

Figure 6:
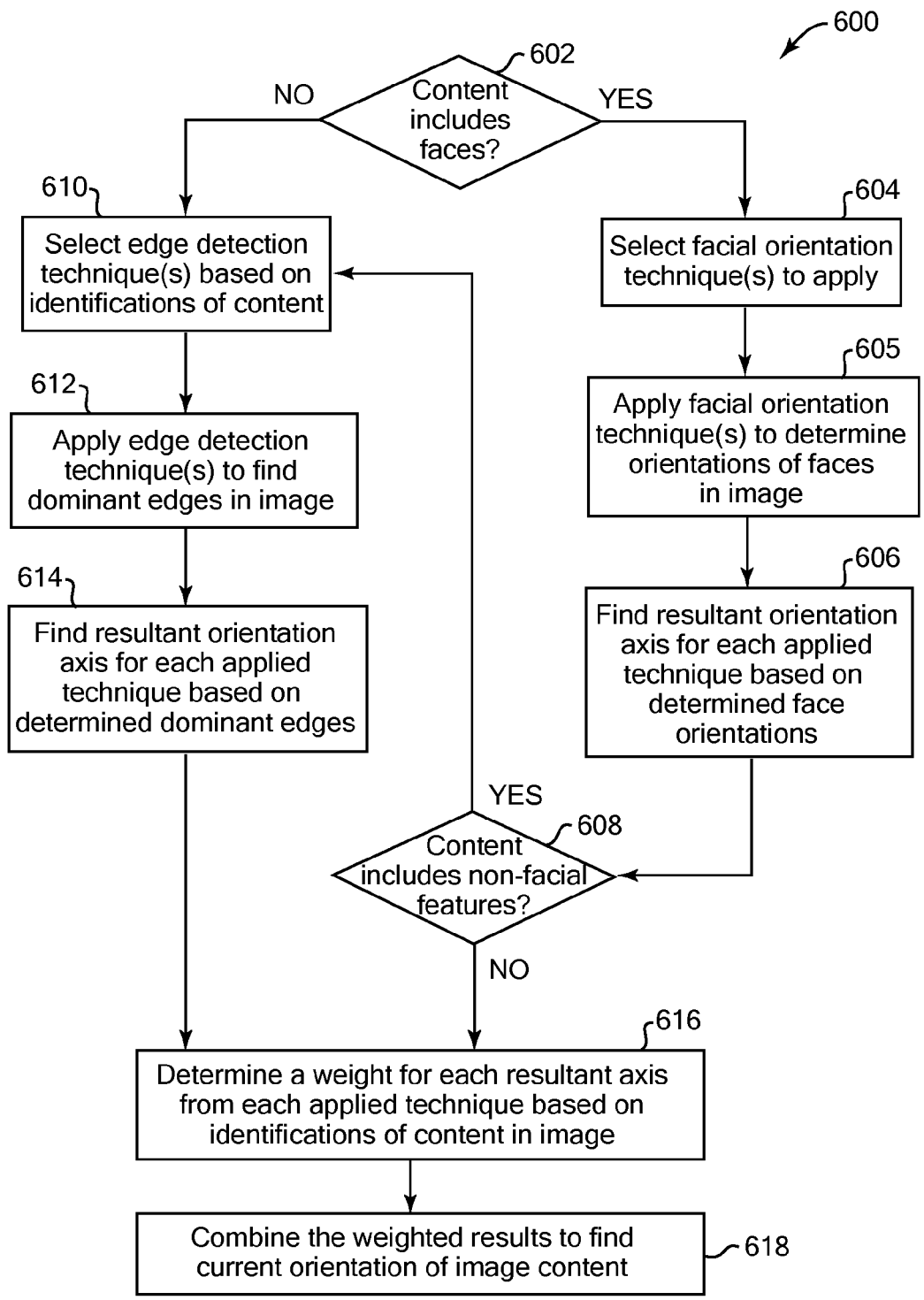
FIG. 6 is a flow diagram illustrating example implementations of determining a current orientation of image content for use in the method of FIG. 5.

FIG. 6 is a flow diagram illustrating a method 600 providing example implementations of block 508 of FIG. 5, in which one or more analysis techniques are applied to the image and a current orientation is determined for content depicted in the image, based on one or more obtained identifiers of the depicted content.

In block 602, the method checks whether the identified content depicted in the image includes any faces. For example, the image can be examined by facial recognition techniques to determine whether there are any faces depicted, by looking for facial features in the image. The identity of any persons depicted in the image need not be determined in some implementations. If the content includes one or more faces, then the method continues to block 604 to select one or more facial orientation techniques to apply. In some implementations, multiple different analysis techniques are available for analyzing the image for orientation, and the method selects one or more of those techniques that are intended to be used with one or more faces depicted in the image. In some implementations, the selection of a technique is made based on the facial content in the image. For example, one facial orientation technique may be better at determining an orientation of the image content with multiple faces as opposed to a single depicted face, or may be better at finding an orientation of a face that is turned so that only partial facial features are visible in the image. Some implementations can apply multiple techniques, where the results of the techniques can be weighted different as described below. Facial orientation techniques can be selected based on the identifications of content in the image, such as the number of faces found in the image, the sizes of faces, or other characteristics.

In block 605, the selected facial orientation technique(s) are applied to determine orientations of faces depicted in the image. The techniques can use a variety of methods. For example, in some implementations a technique can draw a vector between the eyes of each face depicted in the image, as shown in the example of FIG. 2B. A vector indicates the orientation of the associated face. The eyes of a face are readily detectable using facial recognition techniques, and the vector can be drawn through the center of each eye. Multiple faces in the image can be similarly detected and a face orientation vector provided between the eyes of each face to determine each face's orientation (e.g., with reference to a predetermined axis such as a horizontal axis).

In block 606, the method finds a resultant orientation axis for the image for each applied facial orientation technique based on the determined orientations of the depicted faces. A resultant axis indicates the current orientation of the depicted content of the image. Each applied technique can provide its own determined resultant axis. For example, in some implementations, when using a facial orientation technique as described above including eye-connection vectors, if only one face in the image was used with the selected technique of block 604 (e.g., there is one face suitable for use in the image), then the resultant axis corresponds with the eye-connection vector for that face. If multiple faces in the image are used with the technique, then a resultant axis can be determined based on the multiple vectors determined for the multiple faces. In some implementations, the eye-connection vectors from the depicted faces can be combined in one or more ways to determine the resultant axis. In one example, the eye-connection vectors can be averaged to determine the resultant axis. In some examples, the median or mode of the eye-connection vectors can be used as the resultant axis, where the median is the vector in the middle of the vector distribution, and the mode is the most commonly-occurring vector in the vector distribution. In another example, a linear regression is performed with all the face orientation vectors and the resulting vector is the resultant orientation axis. Other techniques can also be used to find a resultant axis that takes into account the face orientation vectors determined in block 604. After the resultant axis for the image is determined, the method proceeds to block 608, detailed below.

If the content is found to not depict faces in block 602, or after the resultant orientation axis is found in block 606, the method checks in block 608 if the identified content depicted in the image includes non-facial features. In some implementations, such non-facial features can include features from natural environment or landscape scenes, including flat horizons, mountains, lakes, grass, hills, sky, clouds, and/or other features. Some implementations can include non-facial features from cities, towns, or artificial structures or objects, such as roads, buildings, signs, bridges, fences, or other features. Other objects can also be included as non-facial features. If the depicted content includes one or more such non-facial types of features, then the method continues to block 610.

In block 610, the method selects one or more edge detection techniques to use based on the identifications of content depicted in the image. In some implementations, the particular edge techniques selected can be based on predetermined associations of particular techniques with particular types of depicted content. For example, it may be known that some techniques are better at detecting dominant edges if the content is more naturalistic or from a natural environment, such as mountains or lakes, while other techniques may be better at detecting dominant edges for content including straighter or artificial edges, as for buildings, roads, walls, fences, or other artificial structures or objects (soda cans, furniture, etc.). In some example implementations, one edge detection technique can be a Hough transform used to detect edges in the image, and another edge detection technique can be a Fourier analysis and transform technique, where the Hough transform may, for example, provide better edge detection for content depicting buildings than for naturalistic features. In one example, if building type content is depicted in image, the Fourier analysis technique can be selected and the Hough transform not selected. In some implementations, multiple or all available edge detection techniques can be selected, and their results weighted differently in determining the resultant orientation based on the depicted content, as described below. Other edge detection techniques can also be used.

In block 612, the method applies each selected edge detection technique to the find the one or more dominant edges in the image for each applied technique. As described above, an edge detection technique such as a Hough transform, Fourier transform, and/or other type of technique can be used to find dominant edges. In another example, a technique using a histogram of gradients or gradient magnitudes can be used to detect dominant edges in the image. In some examples, the dominant edges are edges to depicted features that have the longest length and/or visibility in the image. In some implementations, the edge detection techniques can be instructed to find approximately horizontal dominant edges, such as edges within a predetermined range of horizontal as defined, for example, by the top and bottom edges of the image. Other implementations can find dominant edges in other orientations (e.g. vertical) or in any orientation.

In block 614, the method finds a resultant orientation axis for each applied edge detection technique applied in block 612 based on the found dominant edges. In some implementations, for example, a particular technique may find multiple dominant edges. A single resultant axis can be determined from the multiple dominant edges. For example, the multiple dominant edges can be averaged, or a median, mode, or linear progression can be determined, to find a resultant axis for the image. A resultant axis is found for each edge detection technique applied in block 612.

Block 616 is performed after edge detection techniques are applied in 614, or if no non-facial features are depicted in the image as determined in block 608. In block 616, the method can determine a weight for each resultant orientation axis determined by each applied technique based on the identifications (such as identifiers or descriptors) of content depicted in the image. The applied techniques are all considered in this block, including any applied facial orientation techniques as well as applied edge detection techniques. For example, some techniques may be known to be better at finding desired edges for particular types of content. The results from such techniques can be increased in weight if the depicted content matches those types, while results from techniques known to not perform as well for the depicted type of content can be reduced in weight. In some examples, as described above, multiple edge detection techniques can be applied to the image, each providing a resultant orientation axis, where some techniques may be better at analyzing artificial features than naturalistic features. In other example implementations, facial orientation results can be weighted greater than results from edge detection techniques, or vice-versa. In one example, an image may depict multiple types of content, including faces and landscape features as well as other features, and both edge detection and facial orientation techniques may have been applied. The results of these techniques can be weighted based on the identified content depicted in the image as described above.

In block 618, the method combines the weighted results as determined in block 616 (if such weighted results were determined) to find a current orientation of the image content. In some implementations, for example, the resultant orientation axis resulting from each applied technique can be included in the determination of a final resultant axis indicating the image orientation. For example, an average, linear progression, or other method can be used to determine the final orientation from multiple resultant orientation axes of different applied techniques. The weight of each resultant axis is included in the determination. If, for example, edge detection results are given a much lower weight than facial orientation results, then the facial resultant axes will be closer to the final orientation determination than edge detection axes. The final resulting orientation axis is used to determine the amount of rotation correction for the image, as described above with reference to FIG. 5.

Figure 7:
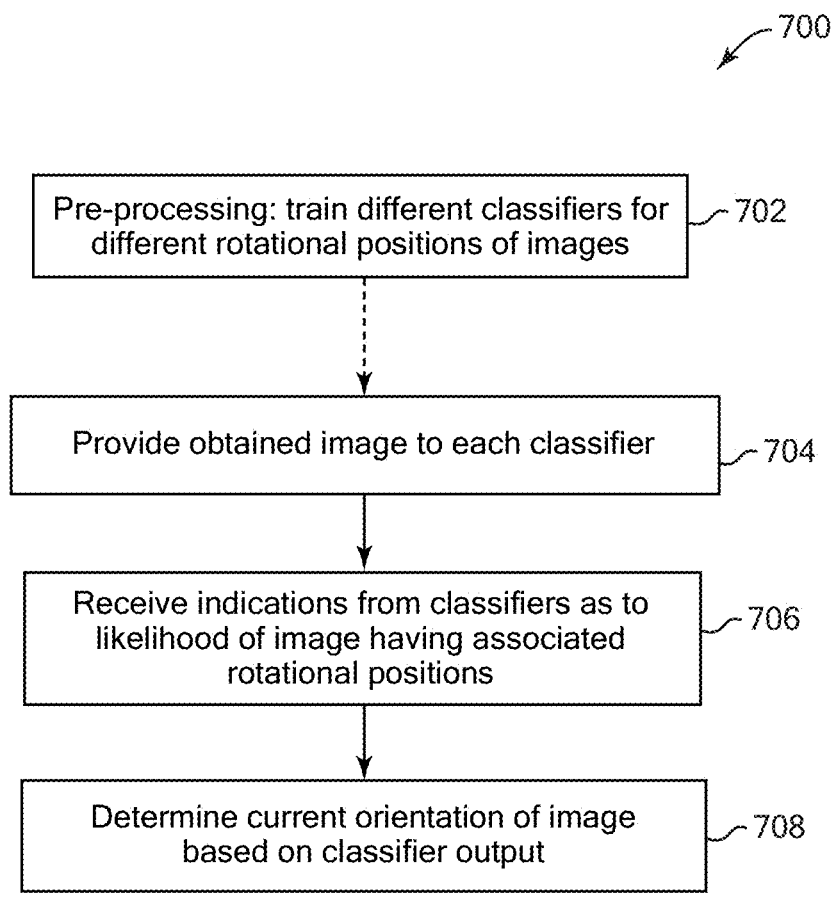
FIG. 7 is a flow diagram illustrating a second example implementation of determining a current orientation of image content for use in the method of FIG. 5.

FIG. 7 is a flow diagram illustrating a method 700 providing other example implementations of block 508 of FIG. 5, in which one or more analysis techniques are used on the image and a current orientation is determined for identified content depicted in the image, based on one or more obtained identifiers of the depicted content. Method 700 uses machine learning or supervised learning techniques to evaluate images and determine an orientation of a particular image.

Method 700 includes a pre-processing block 702 which can be performed before a subject image is to be corrected for orientation in method 400 or method 500. Block 702 can be performed on a different system than the system performing the method 400 or 500, or on the same system. In block 702, different classifiers are trained for different associated rotational positions of images. In some implementations, each classifier is a process that is trained with a particular rotational position of images, so that the classifier can recognize when a new image that is input to the classifier has content having that trained rotational position. A classifier can, for example, be trained with images that are known to have been rotated to a particular rotational position, such as a particular amount of degrees rotated from a known correct orientation. For each received training image, a classifier can use similar content identification and analysis techniques as described above with respect to FIG. 6 to determine a resultant axis and orientation of the content in the training image. For example, one or more edge detection and facial detection techniques can be applied. Several such training images can be fed to the classifier to provide a general profile of results which the classifier expects to see if an image has content at the associated rotational position for that classifier. For example, in some implementations, hundreds or thousands of training images can be used to train the classifier.

Several such classifiers can be trained for different rotational positions in the range of possible positions of images. For example, in some example implementations, a classifier can be trained for each degree, half degree, or quarter-degree step around a full 360-degree range of rotation of images. Thus, in one example, one classifier can be trained with images that have been rotated 5 degrees from a known correct orientation, while another classifier can be trained with images rotated 4 degrees. The set of classifiers is then trained to detect different rotational positions.

Blocks 704-708 can be performed during run-time, when an obtained image is being processed to determine its orientation, as in block 508 of FIG. 5 in some implementations. In block 704, the image is provided to each classifier. For example, if a classifier is provided for each degree of rotational position in a full 360-degree range, then the image can be input to the 360 classifiers. In block 706, the method receives an indication output from each of the classifiers as to the likelihood that the image content has the rotational position detected by that classifier. In some implementations, this indication can be a negative or positive indication. In one example, an image having 5-degree clockwise rotation from a horizontal reference position is input to the set of classifiers. Classifiers detecting rotations of 3 and 4 degrees clockwise, respectively, provide a negative output indicating that the image content is not rotated 3 or 4 degrees. A classifier detecting rotations of 5 degrees finds characteristics in the content and a resultant axis matching the image rotation has been trained with, and so provides a positive indication that the image content is likely rotated 5 degrees. In some implementations, each classifier can provide a confidence level or value within a continuous range to indicate a likelihood that the image is rotated to the associated rotational position.

In block 708, the method determines the current orientation of the image based on the classifier output. In some implementations, this can include selecting a single classifier that has provided a positive result and designating the associated rotational position as the current orientation of the image. In some implementations, multiple classifiers may have provided a positive result, or one or more classifiers may have provided a sufficiently-high likelihood of the image being at its rotational position as to be considered positive, e.g., a likelihood above a predetermined threshold. In some implementations, the method can perform further processing to determine a current orientation from the multiple positive results. In one example, the multiple positive results can be averaged, e.g., if the associated classifiers are within a threshold rotational position of each other. In another example, the method can perform its own analysis of the image to guide a selection of one (or a subset) of the classifier results as determining the current orientation of the image. The determined current orientation is then used in the remainder blocks of the rotational correction method, such as in FIG. 5.

In some implementations, block 524 of FIG. 5 in which the image can be snapped to determined rotational positions and/or the determined rotational positions can be displayed for a user, the rotational positions for snapping or displaying can be obtained from the classifiers described above. For example, if multiple classifiers provide positive results or a high likelihood for their associated rotational positions, the image can be snapped to each of the associated rotational positions of these classifiers in accordance with user rotational input.

It should be noted that the blocks described in the methods of FIGS. 4-7 can be performed in a different order than shown and/or simultaneously (partially or completely) with other blocks, where appropriate. In some implementations, blocks can occur multiple times, in a different order, and/or at different times in the methods. In some implementations, one or more of these methods can be implemented, for example, on a server, such as server system 102 as shown in FIG. 1. In some implementations, one or more client devices can perform one or more blocks instead of or in addition to a server system performing those blocks.

Figure 8:
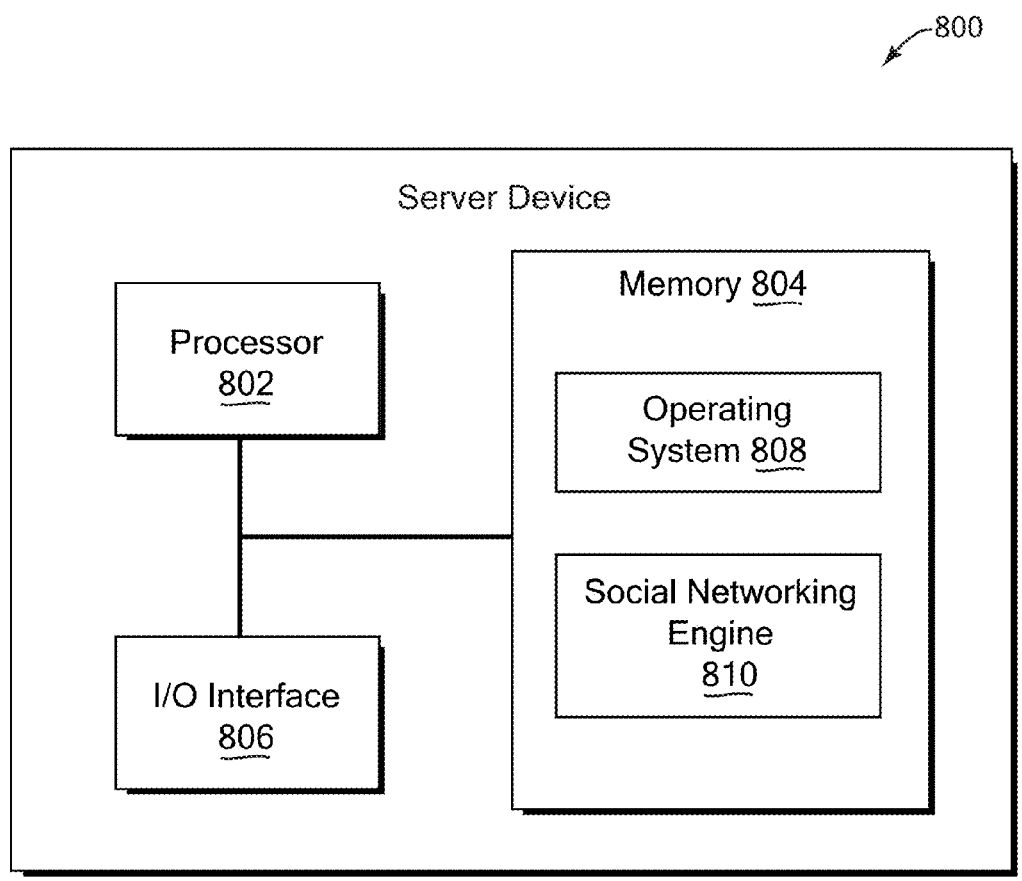
FIG. 8 is a block diagram of an example device which may be used for one or more implementations described herein.

FIG. 8 is a block diagram of an example device 800 which may be used to implement some implementations described herein. In one example, device 800 may be used to implement server device 104 of FIG. 1, and perform appropriate method implementations described herein. Server device 800 can be any suitable computer system, server, or other electronic or hardware device. For example, the server device 800 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 800 includes a processor 802, a memory 804, and input/output (I/O) interface 806.

Processor 802 can be one or more processors or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, such as random access memory (RAM), read-only memory (ROM), electrical erasable read-only memory (EEPROM), Flash memory, etc., suitable for storing instructions for execution by the processor, and located separate from processor 802 and/or integrated therewith. Memory 804 can store software operating on the server device 800 by the processor 802, including an operating system 808 and a social networking engine 810 (and/or other applications) in some implementations. In some implementations, the social networking engine 810 or other application engine can include instructions that enable processor 802 to perform the functions described herein, e.g., some or all of the methods of FIGS. 4-7. Any of software in memory 804 can alternatively be stored on any other suitable storage location or computer-readable medium. In addition, memory 804 (and/or other connected storage device(s)) can store images, content, and other data used in the features described herein. Memory 804 and any other type of storage (magnetic disk, optical disk, magnetic tape, or other tangible media) can be considered "storage devices."

I/O interface 806 can provide functions to enable interfacing the server device 800 with other systems and devices. For example, network communication devices, storage devices such as memory and/or database 106, and input/output devices can communicate via interface 806. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software modules. In other implementations, server device 800 may not have all of the components shown and/or may have other elements including other types of elements instead of, or in addition to, those shown herein. While systems are described as performing blocks as described in some implementations herein, any suitable component or combination of components of a system, or any suitable processor or processors associated with such a system, may perform the blocks described.

A client device can also implement and/or be used with features described herein, such as client devices 120-126 shown in FIG. 1. Some example client devices are described with reference to FIG. 1 and can include some similar components as the device 800, such as processor(s) 802, memory 804, and I/O interface 806. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
    obtaining an image including image content;
    causing a display of the image on a display device;
    obtaining one or more identifications of content depicted in the image;
    selecting and applying a plurality of techniques to determine a current orientation of the content depicted in the image, wherein the current orientation is determined based on the one or more identifications of the content, wherein the plurality of techniques are selected from a plurality of available techniques;
    determining a plurality of different amounts of rotation that orient the content closer to a reference orientation than to the current orientation, wherein the different amounts of rotation are associated with different techniques of the plurality of techniques applied to determine the current orientation, wherein each of the plurality of different amounts of rotation indicates a different rotated orientation of the image;
    receiving input from a user in a graphical interface of an image editing program displayed on the display device, the input instructing rotation of the image;
    in response to the input, selecting one of the plurality of different amounts of rotation and rotating the image by the selected amount of rotation to the rotated orientation closest to the display of the image among the different rotated orientations in a rotational direction indicated by the user input; and
    causing an updated display of the rotated image, including displaying the image at a displayed rotated orientation based on the selected amount of rotation.

2. The method of claim 1 wherein selecting and applying a plurality of techniques includes:
    selecting and applying one or more facial orientation techniques to determine an orientation of one or more faces identified in the identified content, including determining a facial orientation axis based on an axis between two eyes of at least one of the one or more faces;
    selecting and applying one or more non-facial orientation techniques to determine an orientation of one or more non-facial features identified in the identified content, including determining a non-facial orientation axis based on an edge detection process used on the one or more non-facial features; and
    determining a final resultant axis based on combining the facial orientation axis and the non-facial orientation axis, wherein the current orientation of the identified content is determined based on the final resultant axis.

3. The method of claim 1 wherein the content includes multiple different types,
wherein the selecting and applying a plurality of techniques includes selecting and applying a plurality of techniques to determine, for each technique, a particular orientation of the identified content depicted in the image, wherein the selection of the plurality of techniques is based on the types of content depicted in the image, and further comprising:
determining a weight for each of a plurality of the particular orientations, wherein the weights are based on the type of content and include a plurality of different weights; and
combining the weighted current orientations determined by the plurality of techniques to determine the current orientation of the content depicted in the image.

4. The method of claim 1 wherein the reference orientation is aligned with an approximately horizontal axis based on one or more borders or edges of the image.

5. The method of claim 1 wherein determining a current orientation includes using an edge detection technique to find at least one dominant edge in the image, and wherein determining at least one of the different amounts of rotation includes determining an amount of deviation of the at least one dominant edge from the reference orientation.

6. The method of claim 2 further comprising:
determining a different weight for each of the facial orientation axis and the non-facial orientation axis, wherein determining a final resultant axis is based on combining the weighted facial orientation axis and the weighted non-facial orientation axis.

7. The method of claim 3 wherein the type of content associated with the edge detection process includes a depiction of a landscape or an outdoor environment.

8. The method of claim 2 wherein determining the final resultant axis includes determining one of an average axis and a linear progression axis for the facial orientation axis and the non-facial orientation axis.

9. The method of claim 2 wherein selecting and applying one or more non-facial orientation techniques to determine an orientation of the one or more non-facial features identified in the content includes:
selecting at least one edge detection technique from a plurality of available edge detection techniques based on a type of the one or more non-facial features, wherein the at least one selected edge detection technique has a predetermined association with the type of one or more non-facial features.

10. The method of claim 2 wherein the one or more faces are a plurality of faces, and determining a facial orientation axis includes determining an axis between two eyes for each of the plurality of faces depicted in the image, and determining the facial orientation axis as a resultant axis fitted to the determined axes of the plurality of faces.

11. The method of claim 10 wherein determining the resultant axis includes determining one of: an average axis from the axes of the plurality of faces, a mode axis from the axes of the plurality of faces, and a mean axis from the axes of the plurality of faces.

12. The method of claim 1 wherein causing an updated display of the rotated image includes causing a snapping of the display of the image to the displayed rotated orientation.

13. The method of claim 1 wherein determining a current orientation includes inputting the image to a plurality of classifiers using machine learning to determine the current orientation of the image, wherein each of the classifiers is previously trained to recognize a different rotational position of an image using training images different from the image.

14. The method of claim 1 further comprising:
determining, based on additional user input, whether the updated display of the rotated image is acceptable; and
in response to determining that the updated display of the rotated image is not acceptable:
rotating the image by a new amount of rotation; and
causing a new updated display of the rotated image, including displaying the image at a displayed rotated orientation based on the new amount of rotation.

15. A system comprising:
a storage device; and
at least one processor accessing the storage device and configured to perform operations comprising:
obtaining an image including image content;
causing a display of the image on a display device;
obtaining one or more identifications of content depicted in the image;
selecting and applying a plurality of techniques to determine a current orientation of the content depicted in the image, wherein the current orientation is determined based on the one or more identifications of the content, wherein the plurality of techniques are selected from a plurality of available techniques;
determining a plurality of different amounts of rotation that orient the content closer to a reference orientation than to the current orientation, wherein the different amounts of rotation are associated with different techniques of the plurality of techniques applied to determine the current orientation, wherein each of the plurality of different amounts of rotation indicates a different rotated orientation of the image;
receiving input from a user in a graphical interface of an image editing program displayed on the display device, the input instructing rotation of the image;
in response to the input, selecting one of the plurality of different amounts of rotation and rotating the image by the selected amount of rotation to the rotated orientation closest to the display of the image among the different rotated orientations in a rotational direction indicated by the user input; and
causing an updated display of the rotated image, including displaying the image at a displayed rotated orientation based on the selected amount of rotation.

16. The system of claim 15 wherein the operation of selecting and applying a plurality of techniques includes:
selecting and applying one or more facial orientation techniques to determine an orientation of one or more faces identified in the identified content, including determining a facial orientation axis based on an axis between two eyes of at least one of the one or more faces;
selecting and applying one or more non-facial orientation techniques to determine an orientation of one or more non-facial features identified in the identified content, including determining a non-facial orientation axis based on an edge detection process used on the one or more non-facial features; and
determining a final resultant axis based on combining the facial orientation axis and the non-facial orientation axis, wherein the current orientation of the identified content is determined based on the final resultant axis.

17. The system of claim 15 wherein the content includes multiple different types,
wherein the operation of selecting and applying a plurality of techniques includes selecting and applying a plurality of techniques to determine, for each technique, a particular orientation of the identified content depicted in the image, wherein the selection of the plurality of techniques is based on the types of content depicted in the image, and further comprising:

determining a weight for each of a plurality of the particular orientations, wherein the weights are based on the type of content and include a plurality of different weights; and combining the weighted current orientations determined by the plurality of techniques to determine the current orientation of the content depicted in the image.

18. A non-transitory computer readable medium having stored thereon software instructions, when executed by a processor, to cause the processor to perform operations including:

obtaining an image including image content;

causing a display of the image on a display device;

obtaining one or more identifications of content depicted in the image;

selecting and applying a plurality of techniques to determine a current orientation of the content depicted in the image, wherein the current orientation is determined based on the one or more identifications of the content, wherein the plurality of techniques are selected from a plurality of available techniques;

determining a plurality of different amounts of rotation that orient the content closer to a reference orientation than to the current orientation, wherein the different amounts of rotation are associated with different techniques of the plurality of techniques applied to determine the current orientation, wherein each of the plurality of different amounts of rotation indicates a different rotated orientation of the image;

receiving input from a user in a graphical interface of an image editing program displayed on the display device, the input instructing rotation of the image;

in response to the input, selecting one of the plurality of different amounts of rotation and rotating the image by the selected amount of rotation to the rotated orientation closest to the display of the image among the different rotated orientations in a rotational direction indicated by the user input; and causing an updated display of the rotated image, including displaying the image at a displayed rotated orientation based on the selected amount of rotation.

19. The computer readable medium of claim 18 wherein the operation of selecting and applying a plurality of techniques includes:

selecting and applying one or more facial orientation techniques to determine an orientation of one or more faces identified in the identified content, including determining a facial orientation axis based on an axis between two eyes of at least one of the one or more faces;

selecting and applying one or more non-facial orientation techniques to determine an orientation of one or more non-facial features identified in the identified content, including determining a non-facial orientation axis based on an edge detection process used on the one or more non-facial features; and determining a final resultant axis based on combining the facial orientation axis and the non-facial orientation axis, wherein the current orientation of the identified content is determined based on the final resultant axis.

20. The computer readable medium of claim 18 wherein the content includes multiple different types, wherein the operation of selecting and applying a plurality of techniques includes selecting and applying a plurality of techniques to determine, for each technique, a particular orientation of the identified content depicted in the image, wherein the selection of the plurality of techniques is based on the types of content depicted in the image, and further comprising:

determining a weight for each of a plurality of the particular orientations, wherein the weights are based on the type of content and include a plurality of different weights; and combining the weighted current orientations determined by the plurality of techniques to determine the current orientation of the content depicted in the image.

* * * * *